(12) United States Patent
Williams et al.

(10) Patent No.: US 7,394,877 B2
(45) Date of Patent: Jul. 1, 2008

(54) LOW-POWER PACKET DETECTION USING DECIMATED CORRELATION

(75) Inventors: Richard Williams, San Diego, CA (US); Michael Golanbari, Santa Rosa, CA (US)

(73) Assignee: Texas Instruments Incorporated, Dallas, TX (US)

( * ) Notice: Subject to any disclaimer, the term of this patent is extended or adjusted under 35 U.S.C. 154(b) by 708 days.

(21) Appl. No.: 10/026,319

(22) Filed: Dec. 20, 2001

(65) Prior Publication Data

US 2003/0118132 A1    Jun. 26, 2003

(51) Int. Cl.
*H03D 1/00* (2006.01)

(52) U.S. Cl. .................................. 375/343; 375/316
(58) Field of Classification Search ................ 375/316, 375/341, 343, 142, 150, 365, 340, 324, 355; 395/558

See application file for complete search history.

(56) References Cited

U.S. PATENT DOCUMENTS

| | | | | |
|---|---|---|---|---|
| 4,538,281 | A | * | 8/1985 | Rajan ........................... 380/31 |
| 5,142,507 | A | * | 8/1992 | Rouquette ................... 367/134 |
| 5,276,706 | A | * | 1/1994 | Critchlow .................... 375/343 |
| 5,373,536 | A | | 12/1994 | Dehner, Jr. et al. |
| 5,491,713 | A | * | 2/1996 | Kwok et al. ................. 375/333 |
| 5,727,032 | A | | 3/1998 | Jamal et al. |
| 5,761,211 | A | * | 6/1998 | Yamaguchi et al. .......... 714/707 |
| 5,815,101 | A | * | 9/1998 | Fonte .......................... 341/123 |
| 5,818,869 | A | * | 10/1998 | Miya et al. .................. 375/150 |
| 5,838,739 | A | * | 11/1998 | Ramesh et al. .............. 375/348 |
| 5,870,594 | A | * | 2/1999 | Doi et al. .................... 713/500 |
| 5,896,423 | A | * | 4/1999 | Okamoto ..................... 375/345 |
| 5,920,555 | A | * | 7/1999 | Hulbert ....................... 370/342 |
| 6,157,820 | A | * | 12/2000 | Sourour et al. ............. 455/226.2 |
| 6,254,991 | B1 | * | 7/2001 | Kono et al. ................. 428/403 |
| 6,289,064 | B1 | * | 9/2001 | Hiramatsu et al. .......... 375/365 |
| 6,310,896 | B1 | | 10/2001 | Langberg et al. |
| 6,438,183 | B1 | * | 8/2002 | Taura et al. ................. 375/343 |
| 6,452,991 | B1 | * | 9/2002 | Zak ............................. 375/365 |

(Continued)

FOREIGN PATENT DOCUMENTS

WO    WO 02/076010 A2    9/2002

OTHER PUBLICATIONS

Shark, L-K et al., "Adaptive Frame Synchroniser for Digital Satellite Communication Systems," IEEE Proceedings F. Communications, Radar & Signal Processing, Institution of Electrical Engineers, Stevenage, GB, vol. 135, No. 1, pp. 51-59, XP000670504, ISSN: 0956-375X.

(Continued)

*Primary Examiner*—Emmanuel Bayard
(74) *Attorney, Agent, or Firm*—Steven A. Shaw; W. James Brady; Frederick J. Telecky, Jr.

(57) ABSTRACT

A method and apparatus is presented for detecting the presence of a packet being transmitted on a communications medium using self-correlation of samples taken from the communications medium. The method saves on power consumption by sampling the communications medium at a sampling rate that is lower than the sampling rate used for sampling the data in the packet. An unexpected result is achieved when packet detection performs better at the lower sampling rate than at the higher sampling rate.

20 Claims, 2 Drawing Sheets

U.S. PATENT DOCUMENTS

| | | | | |
|---|---|---|---|---|
| 6,459,744 B1 * | 10/2002 | Helard et al. | ................ | 375/354 |
| 6,587,500 B1 * | 7/2003 | Persson et al. | ............... | 375/142 |
| 6,643,336 B1 * | 11/2003 | Hsieh et al. | ................. | 375/343 |
| 6,654,926 B1 * | 11/2003 | Raphaeli et al. | ............ | 714/780 |
| 6,718,286 B2 * | 4/2004 | Rivin et al. | ................. | 702/186 |
| 6,744,826 B2 * | 6/2004 | Rabii | ......................... | 375/318 |
| 6,754,292 B1 * | 6/2004 | Pulley et al. | ................ | 375/343 |
| 6,914,949 B2 * | 7/2005 | Richards et al. | ............. | 375/346 |
| 2002/0019239 A1 * | 2/2002 | Kasapidis | ................... | 455/456 |
| 2002/0094048 A1 * | 7/2002 | Simmons et al. | ........... | 375/362 |
| 2003/0215022 A1 * | 11/2003 | Li et al. | ...................... | 375/260 |

OTHER PUBLICATIONS

Shark, L.-K., et al., "Adaptive frame synchroniser for digital satellite communication ststems," IEE Proceedings, vol. 135, No. 1, Feb. 1988, pp. 51-58.

* cited by examiner

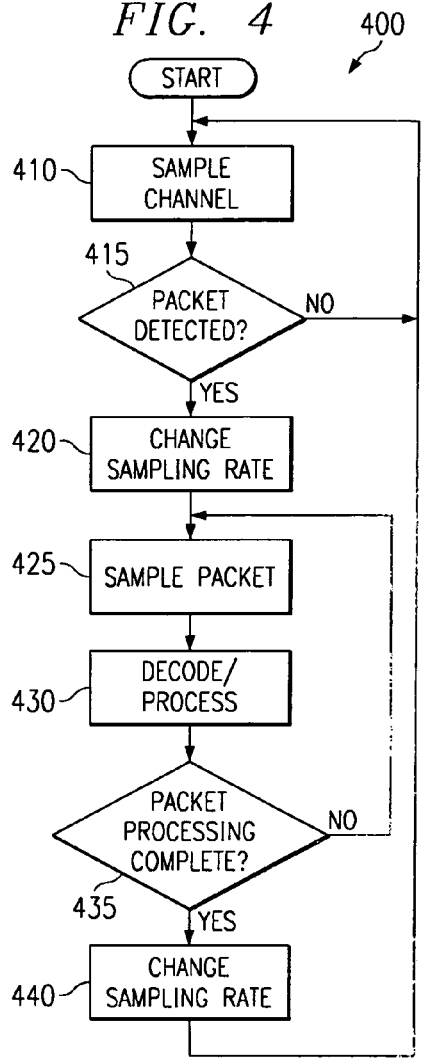
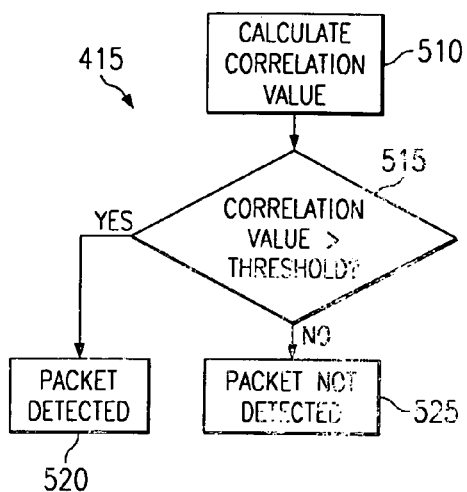
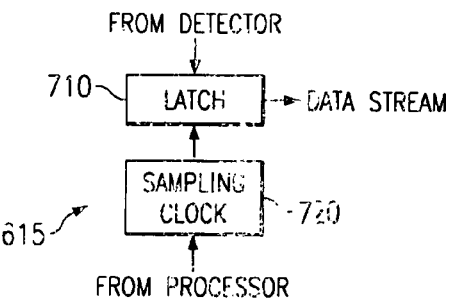
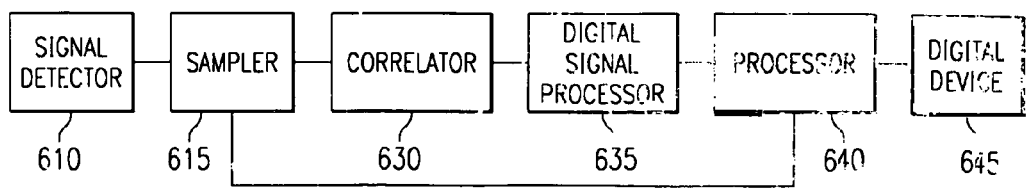

LOW-POWER PACKET DETECTION USING DECIMATED CORRELATION

FIELD OF THE INVENTION

This invention relates generally to digital communications, in particular to detecting the presence of a packet in a communications channel by correlating samples of the communications channel.

BACKGROUND OF THE INVENTION

Receivers for digital communications systems regularly check the status of a communications channel in order to detect the presence of a packet on the channel. If the receivers do not check frequently enough, they may miss the beginning of a packet. This is important since control information is often transmitted at the beginning of a packet. However, if the receiver checks the channel too often, then power and processing time is expended unnecessarily on the detection of a packet. Power consumption is a vital consideration for both line-powered and battery-powered devices since power consumption has a direct bearing on power supply size and/or battery life.

A commonly used technique for detecting the presence of a packet on a communications medium involves sampling the communications channel at a sampling rate that is equal to the sampling rate used by the receiver for subsequent processing. In other words, the sampling of the communications channel while attempting to detect the presence of a packet is at the same rate as the sampling of the communications channel while receiving a packet. Using the same sampling rate simplifies system design and does not require programmable channel sampling devices. Sampling the communications channel produces a sequence of digital samples with each sample corresponding to a snapshot of the communications channel for an instant of time. The sequence of samples can then be correlated, either with a known sequence that is stored in a memory in the receiver or with itself, to detect the presence of a packet. Correlating the sequence of samples with itself is possible if the start of a packet contains a periodic signal since while the communications channel is idle, the sequence of samples will be random and display no pattern, while when a packet is present on the channel, the samples will contain a pattern. It is the presence of a pattern in the samples that can be used to detect the presence of a packet.

Many receivers operate with a sampling rate that is greater than the minimum sampling rate required to accurately recover the transmitted data. The minimum required sampling frequency is twice the frequency of the highest frequency component. This minimum is known as the Nyquist Frequency and is well known to those of ordinary skill in the art of the present invention. However, many receivers operate at a higher sampling rate than the Nyquist Frequency. By operating at higher sampling rates, these receivers are able to more readily separate noise from desired signal (transmitted in a frequency band of interest), making it easier to filter out the desired signal from noise that is in portions of the communications channel outside of the frequency band of interest.

However, operating at a higher sampling rate than necessary results in greater power consumption, hence a correspondingly larger power supply or shorter battery life. Additionally, operating at a higher sampling rate while attempting to detect the presence of a packet on an otherwise idle communications medium has proven to actually degrade the packet detection mechanism. This is due to the fact that sampling at higher sampling rates will also introduce any noise present at those frequencies that are outside of the frequency band of interest into the system often masking the pattern used to detect the presence of a packet.

A need has therefore arisen for a method that will minimize power consumption and at the same time, permit fast and accurate detection of a packet on a communications channel and that introduces a minimum amount of unnecessary noise into the system.

SUMMARY OF THE INVENTION

In one aspect, the present invention provides a method for detecting the presence of a packet being transmitted on a communications channel comprising the steps of sampling the communications channel at a first sampling rate to produce a sequence of samples, correlating the sequence of samples to produce a correlation value, comparing the correlation value with a predetermined threshold, and changing the sampling rate of the sampling operation to a second sampling rate based on the result of the comparison.

There are many advantages to the present invention. A preferred embodiment of the present invention allows a receiver of a communications system to reduce power consumption, hence reducing the size of required power supplies and/or increasing battery life.

Also, a preferred embodiment of the present invention reduces the amount of noise that lies outside of the frequency band of interest from being introduced into the samples, therefore reducing the chance of falsely detecting a packet when one is not present or reducing the chance of not detecting a packet when one is present.

Additionally, a preferred embodiment of the present invention supports a variable sampling rate that will enable the receiver to both improve the detection of a packet and to improve reception of the actual data packet and at the same time, reduce power consumption.

BRIEF DESCRIPTION OF THE DRAWINGS

The above features of the present invention will be more clearly understood from consideration of the following descriptions in connection with accompanying drawings in which:

FIG. 2b illustrates a sampled version of the contents of the communications channel displayed in FIG. 2a;

FIG. 4 illustrates a packet detection and processing algorithm according to a preferred embodiment of the present invention;

FIG. 5 illustrates a packet detection algorithm in greater detail according to a preferred embodiment of the present invention;

FIG. 6 illustrates a receive path for a receiver of a communications system according to a preferred embodiment of the present invention; and FIG. 7 illustrates a sampler in greater detail according to a preferred embodiment of the present invention.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

A preferred embodiment of the present invention discloses a method and apparatus for detecting the presence of a packet on a communications channel that saves on power usage by using a sampling rate that is lower than the usual sampling rate used by a receiver while it is decoding and processing a packet. While the present implementation involves the use of the invention in detecting packets for a specific wireless communications system, namely the IEEE 802.11a wireless local area network, the ideas presented by the present invention have application in other types of networks, including wired networks. Therefore, the present invention should not be construed as being limited solely to the detection of packets in a digital data stream for IEEE 802.11a wireless networks. Examples of other networks where the present invention may have applicability includes Hiperlan networks, Ethernet networks, HomeRF working group networks, etc. In general, the present invention has application in networks where packets do not arrive at specified times.

Figure 1:
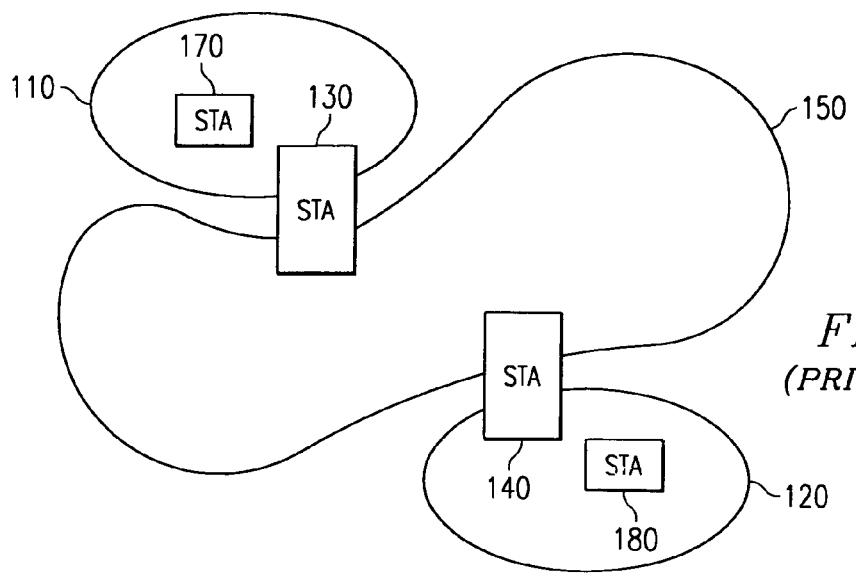
FIG. 1 illustrates a typical configuration for a wireless communications network.

Referring now to FIG. 1, a diagram (prior art) of a typical wireless local area network (LAN) installation according to the IEEE 802.11 technical standard, "ANSI/IEEE Std 802.11, 1999 Edition; Information technology—Telecommunications and information exchange between systems—Local and metropolitan area networks—Specific requirements. Part 11: Wireless LAN Medium Access Control (MAC) and Physical Layer (PHY) Specifications," which is incorporated herein by reference and a supplement to the IEEE 802.11 technical standard, "IEEE Std 802.11a-1999, Supplement to IEEE Standard for Information technology—Telecommunications and information exchange between systems—Local and metropolitan area networks Specific requirements—Part 11: Wireless LAN Medium Access Control (MAC) and Physical Layer (PHY) specifications: High-speed Physical Layer in the 5 GHz Band," which is also incorporated herein by reference. FIG. 1 provides an illustration of the basic building blocks of an IEEE 802.11 network.

FIG. 1 displays a first basic service set (BSS) 110 and a second BSS 120. A BSS is the basic building block of an IEEE 802.11 network and can be thought of as a coverage area within which member stations may participate in direct communications. A BSS is started, formed, and maintained by an access point (AP). BSS 110 corresponds to AP 130 and BSS 120 corresponds to AP 140. An AP is a station that is connected to a distribution system (DS) 150. A DS allows multiple BSSs to interconnect with one another and form an extended service set. The medium used in a DS may be the same as the medium used in the BSSs or it may be different, e.g., the medium used in the BSSs may be wireless radio frequency (RF) while a DS may use fiber optic. Internal to BSS 110 is an AP 130 and a wireless station (STA) 170 while internal to BSS 120 is an AP 140 and a STA 180. A BSS may contain more than two stations (e.g., a maximum of about 20 stations per BSS is typical today), but it will have one AP.

The term medium is often used to refer to a communications channel in a wireless network, while channel is more often used to refer to a communications channel in a wired network. However, the terms are often used interchangeably. In this discussion, the terms medium and channel refer to a communications channel used by a communications system, whether wired or wireless.

Even in a highly loaded network, actual packet transmissions may represent only a relatively small percentage of the total available transmission time. When a packet is not being transmitted on the communications channel, the communications channel is in an idle state and the idle communications channel carries a state that is agreed upon as representing the idle state. For example, an idle communications channel may be silent or it may carry a carrier frequency without any modulation. When a packet is being transmitted on the communications channel, the communications channel will no longer carry a state that is equal to the idle state.

Figure 2A:
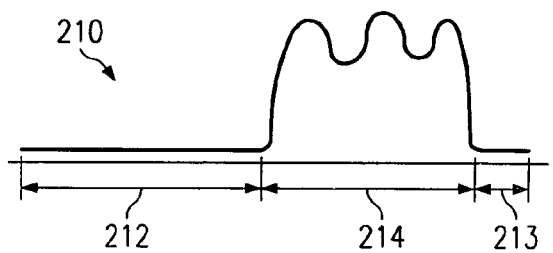
FIG. 2a illustrates a typical time domain view of the contents of a communications channel when it is idle and when it is busy.

Referring now to FIG. 2a, a signal diagram 210 illustrates an exemplary set of signals being carried on a communications channel as a function of time according to a preferred embodiment of the present invention. The signal diagram 210 displays what is being transmitted on the communications channel. For a significant percentage of the time displayed, the communications channel is idle, displayed as straight and flat lines (intervals 212 and 213). Another interval 214 displays a packet being carried on the communications channel. The signal diagram 210 is intended for use in illustrating the difference between an idle and a busy communications channel for an exemplary set of signals and is not intended to accurately portray what the actual signals of the communications channel may look like when it is idle or busy for any specific communications system.

A commonly used technique to detect the presence of a packet on a communications medium involves periodically sampling the communications channel and then correlating the samples with either a known sequence or with itself. The correlation of the samples with the known sequence or with itself is used to detect the presence of the packet.

Figure 2B:
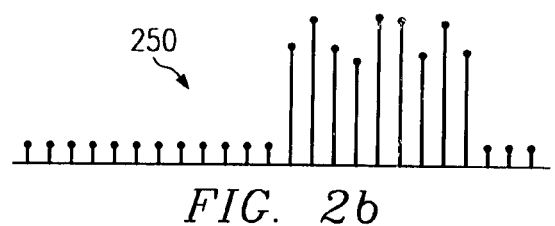

Referring now to FIG. 2b, a diagram 250 illustrates a sequence of samples of a communications channel according to a preferred embodiment of the present invention. FIG. 2b displays a sequence of samples that could represent the sampling of the signal displayed in FIG. 2a. The sequence of samples can be produced by periodically latching the value on the communications channel and then producing a single impulse with a magnitude equal to the value stored in the latch. An impulse is produced each time the value of the communications channel is latched. This is repeated each time the channel is sampled, producing a sequence of samples. The period between the samples can be changed, depending on bandwidth characteristics of the signal being transmitted on the communications channel and the desired sampling rate. The sampling rate should be greater than or equal to twice the maximum frequency of the signal that it is desired to be received from the communications channel in order for the samples to accurately represent the data on the channel. This is known as the Nyquist Frequency and is well known to those of ordinary skill in the art of the present invention.

The sampling of the communications channel may be performed at a varying degree of precision. For example, a single sample may be a simple sampling of a positive or negative signal value on the communications channel, producing a positive or negative sample corresponding to the sign of the signal value on the communications channel. A more precise sampling operation would accurately represent the value of the signal on the communications channel with an n-bit sample, where n is the number of bits used per sample. Large values of n would result in a sample that more accurately represents the actual value of the signal on the communications channel. However, large values of n would produce a sequence of samples with large storage and processing requirements and it would also require more power.

If the sampling rate is greater than the required frequency, the Nyquist Frequency, then the system is said to be oversampling the signal. Oversampling is a signal processing technique that is commonly used to improve the overall performance of the communications system. If the system were to sample the signal stream at a frequency that is greater than the Nyquist Frequency, then the system would perform better, due mainly to the greater separation of signal and noise afforded by the oversampling. Oversampling and its advantages are well understood by those of ordinary skill in the art of the present invention.

However, oversampling has a significant disadvantage as well. In order to oversample a signal stream, the components of the communications system must operate at a higher frequency. Operating at higher frequencies requires higher grade components and consumes more power. Additionally, oversampling in the digital domain produces more samples which in turn requires greater processing power to accurately and fully process the samples.

Note that the actual sampling rate of the communications system can be and often is different from the processing rate of the communications system. The processing rate can be thought of as an internal rate of the communications system at which it processes the data being received. The sampling rate, as discussed above, is the rate at which the received analog signal is being sampled and converted into a digital sequence. The sampling rate of a communications system can be readily changed and compensated, but the processing rate is usually kept constant. Therefore, in many communications systems, the sampling rate is different from the processing rate.

The sampling of the communications channel produces the sequence of samples. Correlating the sequence of samples is then used to detect the presence of a packet if one is present. As discussed previously, correlation involves the comparison of samples from two (or more) sequences or one sequence with itself. The comparison typically involves comparing pairs of samples, one from each sequence. Typically, if the samples match, the correlation results in a one value and if the samples do not match, the correlation results in a zero value. In the general case, correlation can be achieved by multiplying one sample by the complex conjugate of another and using this result to indicate the extent to which the two samples are alike. If the two samples are exactly alike, then the result would be a number with no imaginary component. Usually, more than one correlation is performed with various pairs of samples and the individual correlation results are combined into a single correlation value.

Correlating a sequence with itself is useful to detect the occurrence of a change in the characteristics of the sequence. For example, when the sequence represents a previously idle communications channel changing to a busy channel there will typically be a change in the values of the samples in the sequence. Self-correlation is a commonly used technique to detect such changes. Correlating a sequence with itself involves correlating a sample that has been recently generated with samples that were previously generated.

Figure 3:
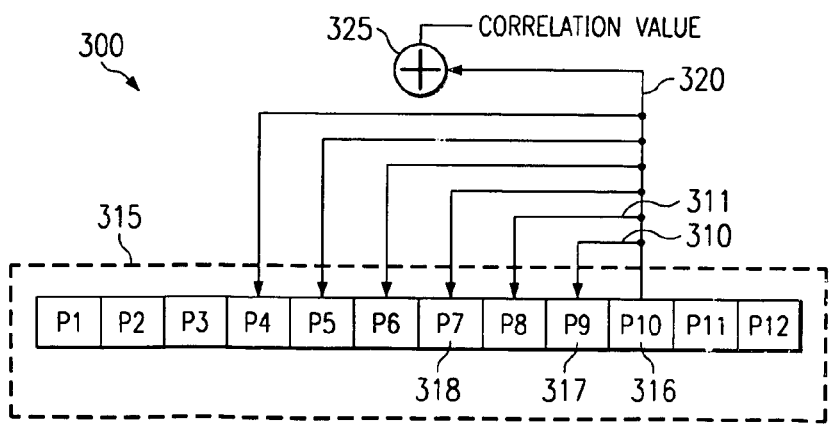
FIG. 3 illustrates a correlation structure for use in self-correlating sample sequences according to a preferred embodiment of the present invention.

Referring now to FIG. 3, a diagram illustrates a correlation structure 300 according to a preferred embodiment of the present invention. The correlation structure 300 is used to correlate a sequence with portions of itself. According to a preferred embodiment of the present invention, the correlation performed by the correlation structure 300 is dependent on the precision of the samples. If the samples are simply sign samples (either positive or negative), then the correlation is a simple comparison. If the samples are n-bit samples, then the correlation is necessarily more complex.

Typically, a sample from one part of the sequence is correlated with samples from another part of the sequence. The correlation structure 300 features a plurality of correlators. The correlators are displayed as inverted U-shaped lines (correlators 310 and 311, for example). The sequence is stored in a memory 315. According to a preferred embodiment of the present invention, the memory 315 is arranged in a first-in-first-out configuration and contains sufficient storage to contain a sufficient amount of the sequence to perform the correlations. The memory 315 is logically partitioned into several blocks (blocks 316, 317, and 318, for example). Each block may contain a single sample from the sequence or a group of samples from the sequence.

A correlation operation, as represented by the correlator 310, operates as follows. A sample, located in memory block 316 is compared with another sample in memory block 317. If a memory block contains more than one sample, then it is preferred that the relative position of the sample in the memory block 316 be the same as the relative position of the sample in the memory block 317. For example, if the memory blocks each contain 10 samples, and if the correlator 310 compares the fourth sample in memory block 316, then it is preferred that the comparison be performed with the fourth sample in memory block 317.

According to a preferred embodiment of the present invention, the size of the memory blocks is set according to an expected period of the sequence. Therefore, by comparing samples in the same relative positions, the correlation compares a sample in one period of the sequence with another sample that is expected to be in the same position in another period of the sequence. Therefore, if the sequence is indeed periodic with a period that is equal to the size of a memory block, then the correlation will ideally compare a sample to itself (from a different period).

If the two samples are the same (or within some allowed difference of each other), then the two samples are determined to be the same and a correlation result is set to one. If the two samples are not the same (or the difference between the two is greater than some allowed difference), then the two samples are determined to not be the same and the correlation result is set to zero. After each of the correlators has completed their comparisons, the individual correlation results are summed together in a summation unit 325. The correlation results are provided to the summation unit 325 via a connection 320. The summation unit 325 sums the individual correlation results and produces a correlation value.

According to a preferred embodiment of the present invention, each correlator in the correlation structure 300 compares a single reference sample (usually, the most recently generated sample) with other samples in the sequence. An advantage of comparing a single reference sample with a plurality of other samples is that if the single reference sample is different from the plurality of other samples, then its difference will result in an immediate and drastic change in the correlation value. This leads to a more rapid detection of a change in the received sequence. For example, the communications channel changing from being idle to carrying a packet could result in a change in the characteristics of the sequence that should be rapidly detected by the correlation structure 300.

According to another preferred embodiment of the present invention, each of the correlators (correlator 310, for example) can compare a group of more than one sample with another group of the same number of samples. By comparing a group of more than one sample in a single correlator, the chance of an error resulting in a bad sample, which in turn will result in an inaccurate comparison, is reduced. A multi-sample correlator is, of course, necessarily more complex. According to yet another preferred embodiment of the present invention, the correlation structure 300 is actually implemented as a software program executing on a processor. The processor may be a general-purpose microprocessor, a digital signal processor, or a custom processor. Implementing the correlation structure in software allows greater flexibility in the type and number of correlations than a hardware implementation.

According to another preferred embodiment of the present invention, any correlation structure that is capable of comparing the received sequence either with itself or with a reference sequence that is stored in a memory will make the present invention operable. Additionally, other traditional methods of comparing sequences and samples, such as the use of matched filters and multiplying one sequence by its complex conjugate and summing the two sequences, if used in place of the correlation structure 300 will also make the present invention operable.

Referring now to FIG. 4, a flow diagram illustrates a packet detection and processing algorithm 400 according to a preferred embodiment of the present invention. According to a preferred embodiment of the present invention, the packet detection and processing algorithm 400 would execute on a processor controlling the operation of a receiver in a communications system. The processor may be a general-purpose microprocessor, a digital signal processor, or a custom processor. The packet detection and processing algorithm 400 executing on the processor controls various components in the receiver.

The receiver begins by continually sampling the communications channel (block 410) by sampling a signal detected by a signal detector at prespecified intervals. The sampling of the signal detected by the signal detector generates a sequence of samples. The sequence of samples is correlated to detect the presence of a packet on the communications channel (block 415). Packet detection using correlation will be described below. If a packet is not detected in the sequence of samples, then the receiver returns to block 410 to continue generating the sequence of samples. Note that the sample generation is a continuous operation that continually operates while the receiver may be busy performing other tasks. The device that performs the sample generation only needs to be told the sampling rate and it begins to generate samples. It continues to do so until it is told to stop.

According to a preferred embodiment of the present invention, the receiver attempts to detect a packet after the generation of each new sample. By attempting to detect a packet after each new sample, a packet on the communications channel is detected as early as possible. Alternatively, several new samples may be generated before the packet detection is attempted. By waiting for several samples to be generated before attempting to detect a packet, the frequency of packet detection is reduced. The packet detection may be periodic, initiating once every time the receiver samples a predetermined number of samples.

According to a preferred embodiment of the present invention, the sampling interval used in generating the sequence of samples in block 410 is at a frequency that is sufficient to accurately represent the entire bandwidth of the signals being carried on the communications channel. In other words, the sampling is being performed at a rate at least equal to the Nyquist Frequency of the data being carried on the communications channel.

If a packet is detected, then the receiver will change the sampling interval so that the end result is a different sampling frequency. According to a preferred embodiment of the present invention, the sampling interval is changed so that the sampling frequency is greater than both the Nyquist Frequency and the initial sampling frequency (used for packet detection). When the sampling is performed at a frequency that is greater than the Nyquist Frequency, then the system is said to be oversampling. Oversampling is typically performed at integer multiples of the Nyquist Frequency, with 2, 3, and 4 being the most commonly used multiples.

With the signal being sampled at the new sampling rate, the receiver decodes and processes the information carried in the packet (block 435). Part of the decoding operation involves determining if the receiver is the intended recipient of the packet. If it is determined that the receiver is not the intended recipient of the packet, then the decoding and processing step terminates and the receiver moves to block 440 of the packet detection and processing algorithm 400. Once the packet has been completely decoded and processed (or if the packet was not intended for the receiver), the receiver will change the sampling interval back to the original sampling interval (block 440) and the receiver will return to detecting the presence of a new packet.

Referring now to FIG. 5, a diagram illustrates a packet detection algorithm 415 using correlation according to a preferred embodiment of the present invention. The packet detection algorithm 415 using correlation is representative of an algorithm that could be used in the packet detection and processing algorithm 400 as discussed in FIG. 4. The packet detection algorithm 415 would also execute on a processor controlling the operation of the receiver in a communications system.

The packet detection algorithm 415 begins with the receiver receiving a sequence of samples from the sampling of the communications channel. The sequence of samples may arrive a single sample at a time or a group of samples at a time, depending on how often the packet detection algorithm 415 is configured to execute. According to a preferred embodiment of the present invention, the sequence of samples is correlated with itself in a correlation structure similar to the correlation structure displayed in FIG. 3. The correlation of the sequence of samples results in a correlation value (block 510).

The correlation value is compared against a predetermined threshold (block 515). The predetermined threshold may be a value that is set based on past performance history of the communications system or it may be an adaptively set threshold that can change depending on the accuracy of the packet detection algorithm 415. A threshold that is set too low may permit the detection of glitches and noise as packets. While a threshold that is set too high may result in the erroneous non-detection of actual packets in the communications channel.

If the correlation value is greater than the threshold, then a packet is detected on the communications channel (block 520). If the correlation value is not greater than the threshold, then a packet is not detected on the communications channel (block 525). The result of the comparison may be written to a memory location or a register that may be checked by the processor. Alternatively, when a packet is detected, a signal flag line may be asserted to let the processor know that a packet has indeed been detected.

Referring now to FIG. 6, a block diagram illustrates a receive path 600 of a receiver in a communications system according to a preferred embodiment of the present invention. In most applications, a receiver is paired with a transmitter into what is commonly referred to as a transceiver. The present invention has application to the receiver portion of a transceiver. Therefore, it is assumed that the transceiver has a transmitter that is fairly typical of transceivers and will not receive any examination.

A signal detector 610 receives information transmitted over the communications channel. The signal detector 610 may be an antenna if the system is a radio frequency wireless communications system, or it may be a sensor if the system uses other types of wireless communications. If the communications system uses conventional wiring, then the signal detector 610 can be a voltage or current sensor. Alternatively, if the communications system uses fiber optics, then the signal detector 610 may be a light sensor. Regardless of the type of communications channel used, the signal detector 610 converts the signal information transmitted on the communications channel into a form that is usable by the receiver.

After being converted into a usable form by the signal detector 610, the electrical signal is sampled at a regular interval by a sampler 615. The design of the sampler is fairly typical and is well understood by those of ordinary skill in the art of the present invention.

Referring now to FIG. 7, a block diagram displays an exemplary implementation of a sampler 615 according to a preferred embodiment of the present invention. The sampler 615 receives from the signal detector 610 an electrical signal representing the signal being carried on the communications channel. The sampler has a latch 710 that is used to store a voltage value at its input. The latch 710 is clocked by a sampling clock 720 that determines the frequency at which the latch stores the voltage value at its input. The sampling clock is controlled by a signal line from the processor. The processor can speed up or slow down the sampling clock, resulting in different sampling rates. The latch 710 has an output that transmits to components further down the receive path a sequence of samples corresponding to the latched values. According to a preferred embodiment of the present invention, the latch 710, after being clocked by the sampling clock 720, stores the current voltage level at its input and then produces a sample corresponding to the voltage level on the data stream.

After being converted into the digital domain by the sampler 615, the sample sequence is forwarded to a correlator 630, where the sequence is correlated with itself. The design of the correlator 630 was previously discussed in FIG. 3 although correlators of other types and designs will also work.

After correlation (if a packet was determined to be present in the sequence of samples), the digital sequence of samples receives digital signal processing by a digital signal processor 635. The digital signal processor 635 performs tasks such as digital filtering and adaptive channel equalization. If the communications system were a multi-carrier system, such as an IEEE 802.11a compliant system, a Fourier Transform would also be performed to convert the samples from the time domain to the frequency domain.

However, since the tasks are performed by software programs executing on a processor, a greater amount of processing can be performed. A processor 640 is present to perform any decoding and further processing required on the digital sequence of samples to make it ready for use by a digital device 645 coupled to the processor 640. The digital device 645 may be a part of the receiver, the transceiver, or it may be an external device that is coupled to the transceiver.

According to a preferred embodiment of the present invention, after the sequence of samples undergoes correlation and it has been determined that the sequence does indeed contain a packet, the processor 640 increases the sampling rate of the sampler 615. By using a higher sampling rate only when a packet is detected and using a lower sampling rate when detecting the presence of a packet on the communications channel, the communications system receives the added performance provided by oversampling the actual packet and reduces power consumption by minimizing the sampling rate when a high sample rate is not needed or even wanted.

The variable sampling (oversampling) rate of the communications system presents several advantages including, but not limited to, reduced power consumption, a decrease in noise interference from outside the frequency of interest, etc. At the same time, by maintaining a constant processing rate, a relatively simple communications system is maintained. If the processing rate is changed, a more complex communications system is required.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A receiver for a communications system comprising:
a signal detector, the signal detector containing circuitry to detect signals transmitted on a communications channel;
a sampler coupled to the signal detector, the sampler containing circuitry to sample the signals detected on the communications channel by the signal detector at a variable sampling rate and produce a sequence of samples, wherein the sampler samples the communications channel at a first sampling rate when attempting to detect a packet and at a second sampling rate when the packet has been detected, wherein the second sampling rate has a different power consumption level than the first sampling rate;
a correlator coupled to the sampler, the correlator containing circuitry to compare samples in the sequence of samples from the sampler and produce a correlation value based on the comparison, wherein the correlator is configured to correlate the sequence of samples with itself; and
a processor coupled to the correlator and the sampler, the processor containing circuitry to detect the presence of the packet based on results produced by the correlator, decode and process data contained in the packet transmitted on the communications channel, and to control and change the sampling rate of the sampler;
wherein the sampler comprises
a latch coupled to the signal detector, the latch containing circuitry to capture a signal value at a first input and produce a sample corresponding to the captured signal value at an output; and
a sampling clock coupled to the latch and the processor, the sampling clock containing circuitry to control the sampling rate of the sampler based on control information from the processor.

2. The receiver of claim 1, wherein the processor changes the sampling rate back to the first sampling rate after completed reception of the packet.

3. The receiver of claim 1, wherein the processor changes the sampling rate back to the first sampling rate after the processor determines that the packet was destined for a different receiver.

4. The receiver of claim 1, wherein the processor changes the sampling rate back to the first sampling rate after determining an erroneous detection of the packet.

5. The receiver of claim 1, wherein the signal detector is a sensor capable of detecting wirelessly transmitted signals.

6. The receiver of claim 1, wherein the signal detector is a sensor capable of detecting signals transmitted on a wireline communications channel.

7. The receiver of claim 1, wherein the first sampling rate is sufficient to accurately recover data encoded in the packet.

8. The receiver of claim 1, wherein the second sampling rate is greater than the first sampling rate.

9. The receiver of claim 8, wherein the second sampling rate is an integer multiple of the first sampling rate.

10. The receiver of claim 8, wherein the second sampling rate is an integer multiple of a minimum sampling rate required to accurately recover data encoded in the packet.

11. A communications device comprising:
    a transmitter to transmit information from the communications device;
    a receiver to receive information sent to the communications device, the receiver comprising
        a signal detector, the signal detector containing circuitry to detect signals transmitted on a communications channel;
        a sampler coupled to the signal detector, the sampler containing circuitry to sample the signals detected on the communications channel by the signal detector at a variable sampling rate and produce a sequence of samples, wherein the sampler samples the communications channel at a first sampling rate when attempting to detect a packet and at a second sampling rate when the packet has been detected, wherein the second sampling rate has a different power consumption level than the first sampling rate;
        a correlator coupled to the sampler, the correlator containing circuitry to compare samples in the sequence of samples from the sampler and produce a correlation value based on the comparison, wherein the correlator is configured to correlate the sequence of samples with itself; and
        a processor coupled to the correlator and the sampler, the processor containing circuitry to decode and process data contained in the packet transmitted on the communications channel and to control and change the sampling rate of the sampler;
    wherein the sampler comprises
        a latch coupled to the signal detector, the latch containing circuitry to capture a signal value at a first input and produce a sample corresponding to the captured signal value at an output; and
        a sampling clock coupled to the latch and the processor, the sampling clock containing circuitry to control the sampling rate of the sampler based on control information from the processor.

12. The communications device of claim 11, wherein the signal detector is a sensor capable of detecting wirelessly transmitted signals.

13. The communications device of claim 11, wherein the signal detector is a sensor capable of detecting signals transmitted on a wireline communications channel.

14. The communications device of claim 11, wherein the processor changes the sampling rate back to the first sampling rate after completed reception of the packet.

15. The communications device of claim 11, wherein the processor changes the sampling rate back to the first sampling rate after the processor determines that the packet was destined for a different receiver.

16. The communications device of claim 11, wherein the processor changes the sampling rate back to the first sampling rate after determining an erroneous detection of the packet.

17. The communications device of claim 11, wherein the first sampling rate is sufficient to accurately recover data encoded in the packet.

18. The communications device of claim 11, wherein the second sampling rate is greater than the first sampling rate.

19. The communications device of claim 18, wherein the second sampling rate is an integer multiple of the first sampling rate.

20. The communications device of claim 18, wherein the second sampling rate is an integer multiple of a minimum sampling rate required to accurately recover data encoded in the packet.

* * * * *